(12) United States Patent
Van Romer

(10) Patent No.: US 6,880,720 B2
(45) Date of Patent: Apr. 19, 2005

(54) PORTABLE CONTAINMENT

(76) Inventor: Edward W. Van Romer, P.O. Box 687, Sandy Spring, SC (US) 29677

( * ) Notice: Subject to any disclaimer, the term of this patent is extended or adjusted under 35 U.S.C. 154(b) by 102 days.

(21) Appl. No.: 10/375,463

(22) Filed: Feb. 27, 2003

(65) Prior Publication Data

US 2004/0169041 A1 Sep. 2, 2004

(51) Int. Cl.$^7$ .................................................. B65D 1/34
(52) U.S. Cl. ......................................................... 220/573
(58) Field of Search ......................................... 220/573

(56) References Cited

U.S. PATENT DOCUMENTS

| | | | | |
|---|---|---|---|---|
| 2,854,049 A | * | 9/1958 | Wyllie | |
| 4,671,024 A | * | 6/1987 | Schumacher | |
| 5,090,588 A | * | 2/1992 | Van Romer et al. | |
| 5,316,175 A | * | 5/1994 | Van Romer | |
| 5,429,437 A | * | 7/1995 | Shaw et al. | |
| 5,762,233 A | * | 6/1998 | Van Romer | |
| 6,112,930 A | * | 9/2000 | McAtarian | |

* cited by examiner

*Primary Examiner*—Joseph Man-Fu Moy
(74) *Attorney, Agent, or Firm*—McNair Law Firm, P.A.

(57) ABSTRACT

A portable containment for receiving spilled fluid having collapsible end and side walls which in combination with a floor form a containment area when held in an upright position by braces position along the walls. In use certain of the walls and braces are collapsed into folded or down positions to allow vehicle entry into the containment area. Skids are positioned beneath the braces associated with certain walls. Flotation members are secured along the upper edges of at least the certain walls. The flotation members are capable of elevating the certain walls in the event spillage occurs prior to the certain walls being repositioned into the upright position. Elevation of the certain walls causes the associated braces to slide over the skids to assure their upstanding position which maintaining the walls in their upright position.

17 Claims, 5 Drawing Sheets

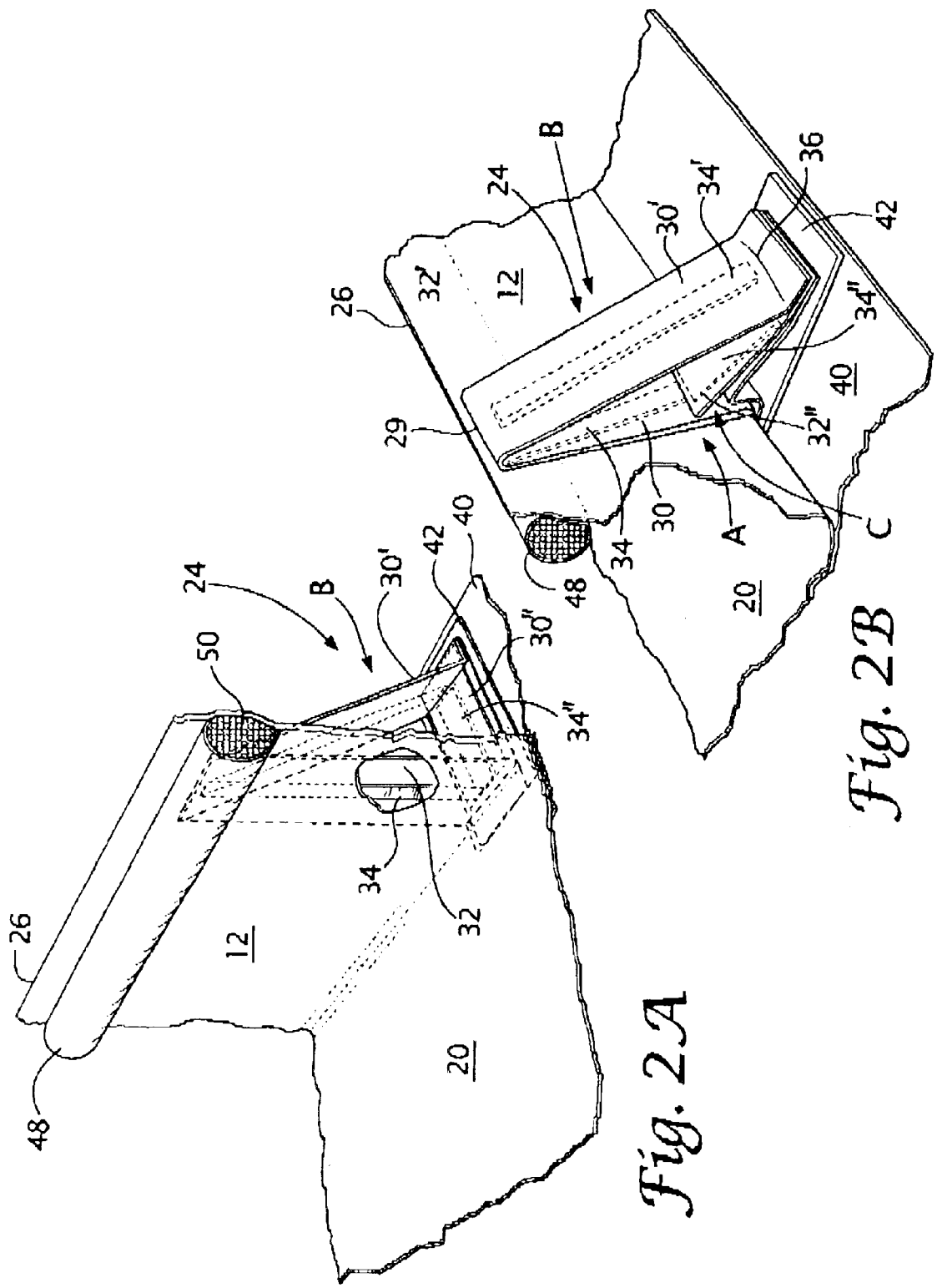

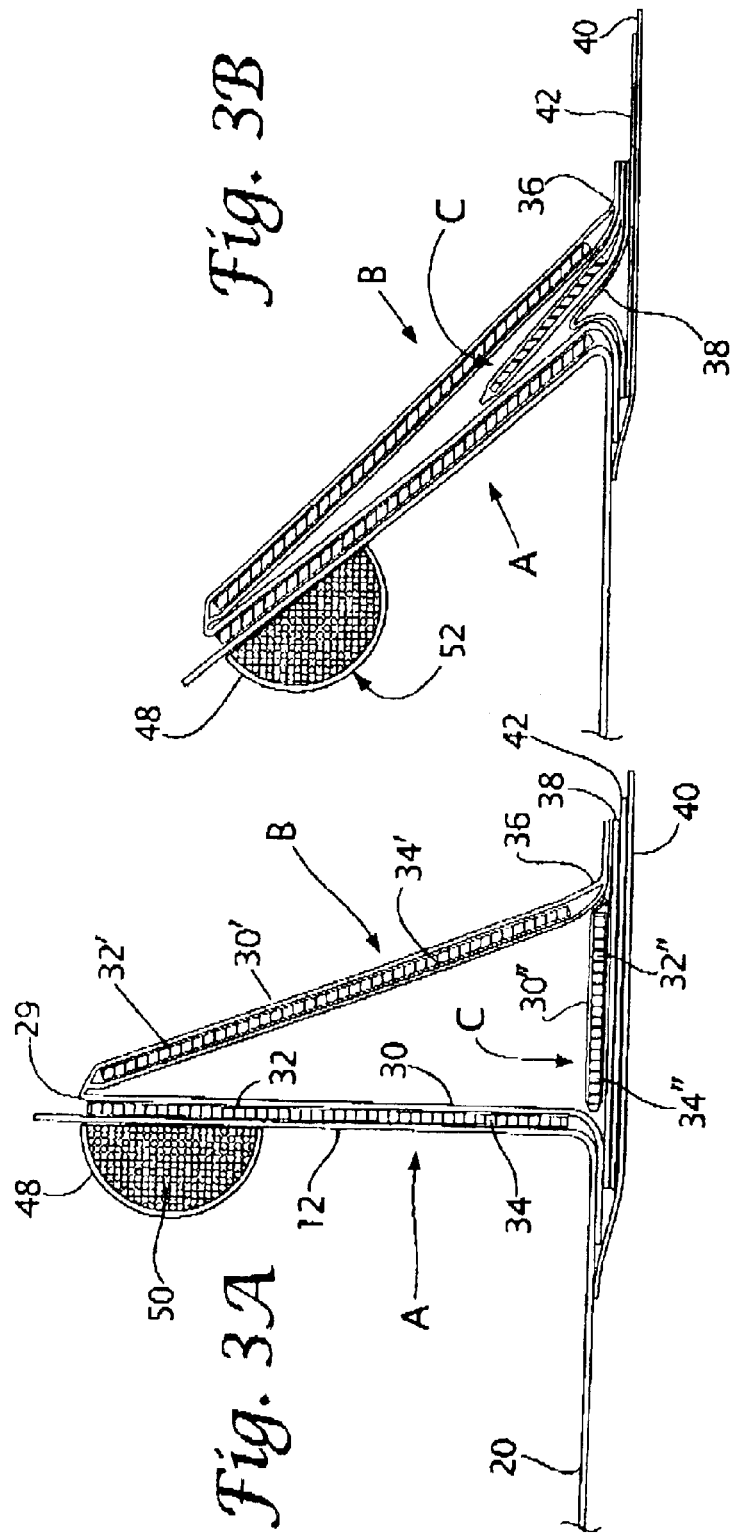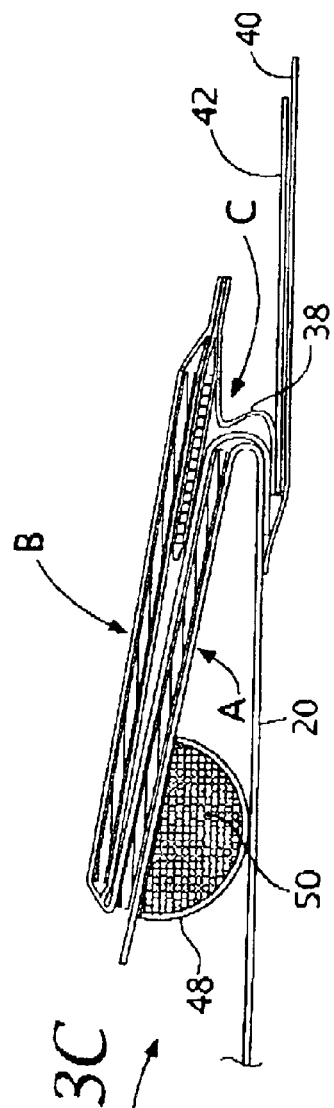

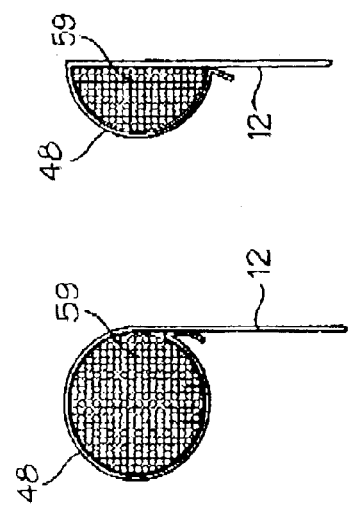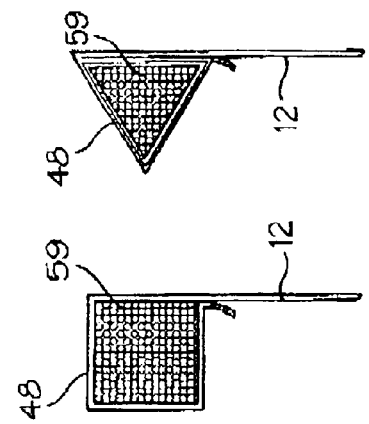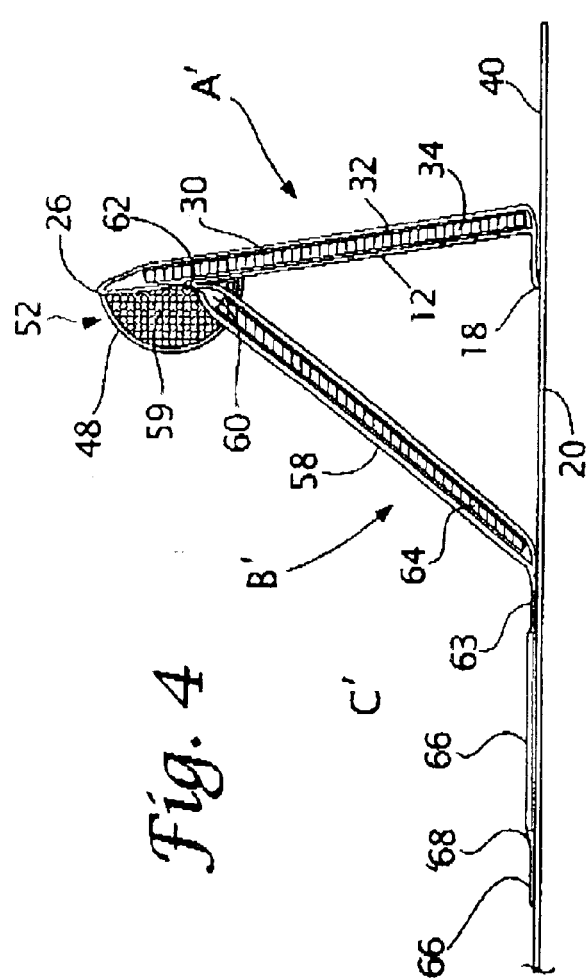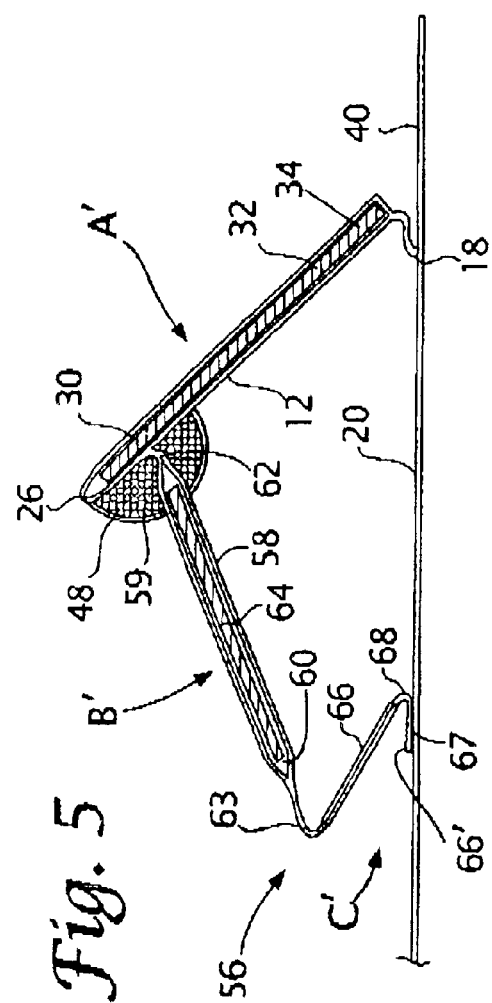

PORTABLE CONTAINMENT

BACKGROUND OF THE INVENTION

This instant invention is directed to a flexible, portable containment for collecting hazardous chemicals such as petrochemicals and the like. Environmental ground contamination is often the long term result of point of source spills of such materials during the transfer from one container to the other. A primary problem exists during the transfer of materials when servicing, to include fueling equipment and particularly vehicles.

Prior art structures for collecting petrochemical contaminants are all known in the art and have been used for years for preventing ground contamination with hazardous material. Examples of these known devices are disclosed in U.S. Pat. Nos. 4,671,024; 5,090,588; 5,316,175; and 5,762,233.

The 024 and the 588 patent devices allow vehicle entry and exit by providing resilient wall structures which are compressed during rollover and return or expand to their original upright position after rollover. These devices present storage and transport problems, reliability problems and cost problems.

The 175 and 233 patents disclose devices which utilize brace members which when positioned in one position retain the containment walls in an upright position and in a second position allow the walls to be folded flat for vehicle entry into the containment area. Should a contaminant be spilled into the containment area while this wall is in the flat folded or down position the contaminant will flow over the down wall and onto the ground. The devices of these products are otherwise reliable, easy to store and transport and are not cost prohibitive.

In order to insure that this situation does not occur it is a primary object of the instant invention to provide a flexible, foldable and portable containment with fail safe wall construction for vehicle traffic onto and off of.

Another object of the invention is the provision of a containment in which at least selected of its walls carry flotation devices.

Another object of the invention is a containment which is highly reliable and can withstand vehicle traffic onto and off of.

Another object of the invention is a portable containment which does not require assembly at the site.

Another object of the invention is a containment in which a plurality of flotation members are carried by selected wall members.

Another object of the invention is to provide a containment in which the wall bracing members will move from the folded position into the locked upstanding position due to upward wall movement.

Another objective of the invention is a containment in which provision is made to prevent human error causing ground contamination.

SUMMARY OF THE INVENTION

The instant invention is directed to a portable containment for containing spilled material. The containment comprises a bottom composed of flexible material, a pair of foldable and upstandable side walls and a pair of foldable upstandable end walls. The side and end walls are interconnected along opposed ends, forming the corners of the containment, and are connected along their respective lower edges with the bottom, forming a containment area.

Preferably the flexible forming material comprised a modified vinyl or polyurethane coated synthetic fabric, woven or knitted.

A plurality of stays are engaged with the side and end walls and act to assist in maintaining the side and end walls in an upstanding configuration.

A plurality of foldable braces are connected at one end adjacent the upper edges of the end and side walls. The braces may be positioned in an extended or upstanding position which maintains the side and end walls in a raised position forming the containment area which contains the spilled material. The braces also allow the walls to be positioned in a down position to allow vehicles to drive over the down wall and into the containment area.

There are pocket members arranged along upper edges of at least the end walls. Flotation devices are carried in each of the pocket members.

The arrangement creates a safety device which will elevate the end walls from the down position to a position above the level of the material being spilled into the containment area and maintain the walls elevated preventing contamination. The flotation members are primarily arranged with the end walls which are usually the ones lowered for vehicle crossover.

A portable containment, for containing spilled material formed of flexible synthetic material and which includes a bottom, end and side walls and brace members. The brace members are connected with the wall members and in a locked upstanding position retain the walls in a raised position. The braces may be selectively arranged in a folded position in which the walls associated with these braces are in a down position.

Skids are arranged beneath the braces. The skids allow the braces to slide outwardly from the folded position to assume the upstanding position as the wall is elevated from the down position into the upstanding position.

The skids provide ease of assembly. They also function to accommodate a safety feature for the prevention of spillage due to accidental filling of the containment area while the selected walls are in the down position.

In the event contaminant is accidentally deposited into the containment area, the contaminant, due to the flotation devices, will raise the walls from the down position. As the walls rise, the legs of the braces slide over the skids into their upright position, securing the walls in the raised position.

The pocket members comprise a plurality of laterally spaced pocket members which are arranged along the upper edge and over the length of the end walls. First ends of the brace members are connect with the end walls between the pocket members. The flotation device comprises a strip or a plurality of strips of polyurethane foam. The polyurethane foam strips may have a cross section which is one of rectangular, square, triangular, circular or half circular.

The pockets are preferably secured on the inner side adjacent the upper edge of the end walls. They may be comprised of folded over upper edges of the end walls or they may be formed separately and attached to the end walls.

The braces may include first, second and third rigid legs with certain ones having an end pivotally attached with the floor. The attachment may be inwardly or of the end and side walls. Each brace may include a leg pivotally connected with an edge of the end and side walls, another leg pivotally connected with the floor with a pivotal connection between the first and second legs. Alternatively, each brace may include a rigid leg pivotally connected with the end and side walls at one end and with an end of a second rigid leg at an opposite end.

A portable containment for receiving and containing spilled fluid having collapsible end and side walls. Each wall, but preferably only the end walls, may be positioned into a collapsed or down position. The brace members associated with the end and side walls are positioned in a folded position when the walls are in the down position. In the down position, the containment is configured to allow vehicle roll over for entry into the containment area. Here the vehicle is serviced in the usual manner.

Flotation members are secured with the upper edges of at least certain selected ones of the walls, preferably the end. The flotation members form a safety device which, with the selected wall is in the down position and should fluid accidentally spilled into the containment area, act to elevate and maintain the upper edge of the selected wall above the level of the spilled fluid. By so functioning, the flotation members act as a safety device or a fail safe device which act to eliminate human error.

The flotation members may be spaced by the brace members. They are also preferably secured along the inner side of the upper edge of the walls to which they are attached.

It is further preferable that the flotation devices are carried in pockets which are formed adjacent the upper edges of the selected walls.

The flotation devices preferably are comprised of polyurethane bars of selected cross sectional shape.

DESCRIPTION OF THE DRAWINGS

The construction designed to carry out the invention will hereinafter be described, together with other features thereof.

The invention will be more readily understood from a reading of the following specification and by reference to the accompanying drawings forming a part thereof, wherein an example of the invention is shown and wherein:

FIG. 2A is a sectional perspective view showing the first brace arrangement in the upstanding position maintaining the wall portion in a raised position.

FIG. 2B is similar to FIG. 2a showing the brace arrangement in an intermediate position.

FIG. 3A is a section or side view showing the brace in an upstanding position retaining the wall position in a raised position.

FIG. 3B is similar to FIG. 3A showing the brace member in an intermediate position.

FIG. 3C is similar to FIGS. 3A & B showing the brace member in the folded position.

FIG. 4 is a sectional side view showing the second brace arrangement in its upstanding position holding the wall portion in a substantially upright position.

FIG. 5 is similar to FIG. 4 showing the brace in its intermediate position in which the associated wall portion is being folded or lowered.

FIG. 6a is a cross sectional side view showing a first cross-sectional shape of a flotation member in its carrying pocket secured to the associated wall.

FIG. 6b is similar to FIG. 6a showing a second configuration for the flotation members.

FIG. 6c is similar to FIG. 6a showing a third configuration for the flotation member.

FIG. 6d is similar to FIG. 6a showing a third configuration for the flotation members.

DESCRIPTION OF A PREFERRED EMBODIMENT

Figure 1A:
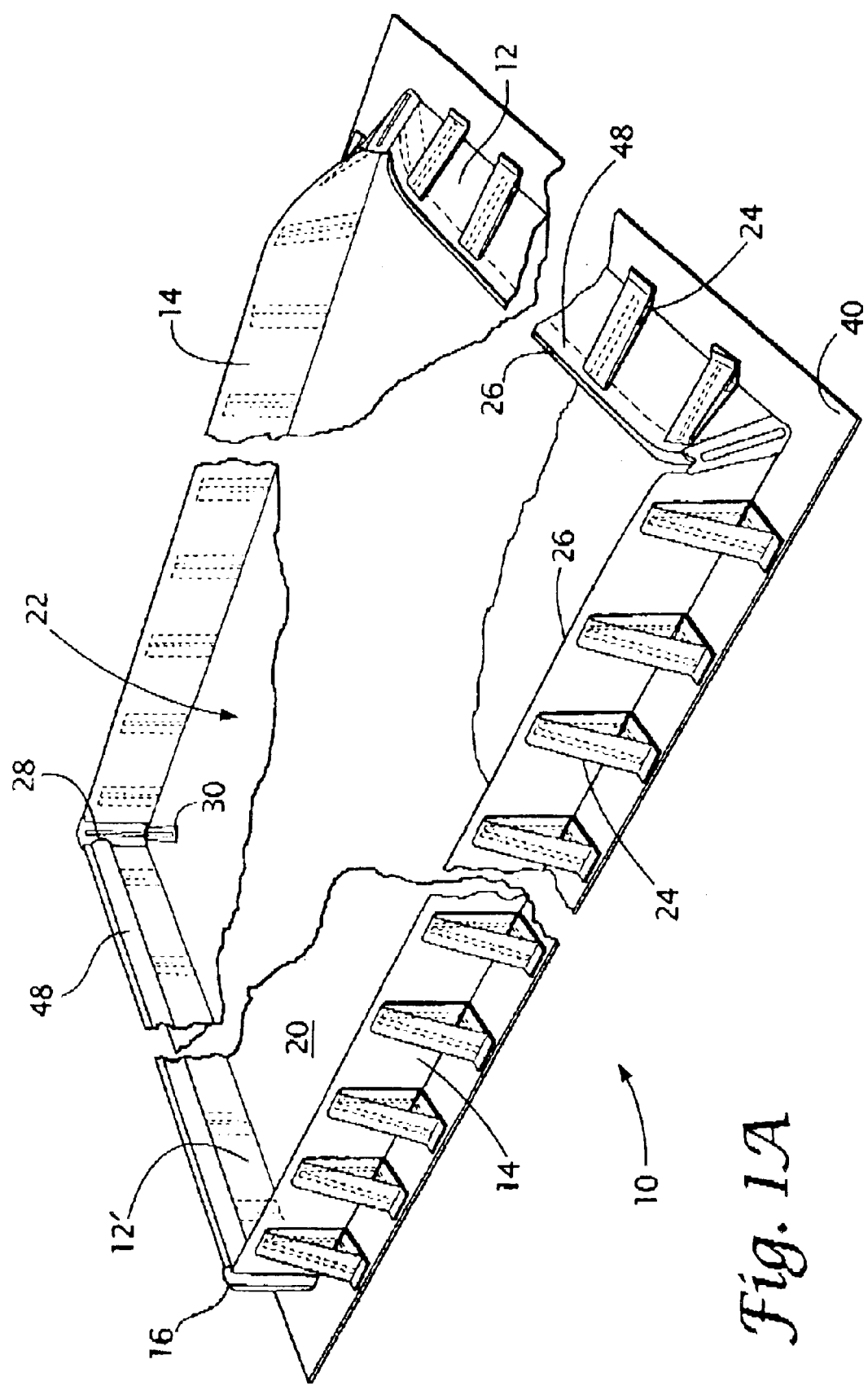
FIG. 1A is a perspective view of the containment showing a first brace arrangement with an end and the side walls positioned in the upright position and the opposed end wall in the down position.

Referring now in more detail to the drawings, it can be seen in FIG. 1A flexible and portable containment device designated 10. Containment device 10 is shown with end wall 12 in the down or lowered position while in FIG. 1A end wall 12' and side walls 14 shown in the generally upright or raised position. Walls 12, 12' and 14 are interconnected at opposing ends forming corners 16 and along their lower edges 18 with bottom 20 forming containment area 22. Heat welding is a preferred method of interconnecting these individual members. It is also noted that walls 12, 12" and 14 along with bottom 20 may be formed of a continuous piece in which case corners 16 may be formed by simply folding that portion of the coated vinyl sheet forming the wall.

Braces 24 which are shown connected along the height of the walls and adjacent the upper edges 26 of walls 12, 12' and 14 and with flange 40, function to secure walls 12, 12' 14 in the generally raised position.

The material forming the containment is preferably some form of a vinyl sheet or a vinyl coated fabric. Polyurethane is a suitable coating material. In matter of fact, any synthetic coated fabric generally suitable for agricultural and/or industrial use, which is resistant to petrochemical degradation, is of sufficient grade to withstand the wear of entering and exiting vehicles and which is sufficiently flexible is suitable. Satisfactory fabrics are manufactured by the Seamon Corp. of Wooster, Ohio, Cooley, Inc. of Pawtucket, R.I. It is preferred that containment 10 be formed in a rectangular configuration as shown, however, it is understood that other configurations such as square, circular, or rectangular are equally acceptable depending upon the intended use.

Again turning to FIG. 1A along with FIGS. 2A, B & 3A, B & C it can be seen that each corner 16 is provided with a unshaped bracing element 28 secured by way of a strip 30 which is heat welded with the bottom, end and side walls. Bracing element 28 is more fully described in U.S. Pat. No. 5,316,175, the disclosure of which is incorporated herewith, functions to assist in holding the corners in a generally upright position when walls 12, 12' and 14 are in that position. Bracing elements 28 are hinged at substantially their central point allowing them to fold upon themselves when it is desired to fold the containment for transport to allow for vehicle roll over or vehicle entry and exit when the containment is deployed for use.

Flange or fringe 40 is preferably sized to extend outwardly up to a length at least equal the height of walls 12, 14. The flange is preferably between six inches and twelve inches in width. Secured with fringe 40 at spaced intervals aligned with braces 24 are skids 42. Skids are designed to support and provide a low friction surface for end portions of legs B, C of braces 24 during sliding movement of the brace from the folded position into the upright position as will be more fully described further on. It is noted that the flange and skids may be provided only adjacent walls 12, 12'.

Returning again to FIGS. 2 and 3, it can be seen that each brace 24 includes a strip 30 secured with the wall in a vertical position, preferably by heat welding, forming pocket 32. A semi-rigid stay 34, is carried in each pocket 32 of each strip 30. Stays 34 are of a length slightly less than the height of walls 12, 12' and 14 and act to retain them substantially along a single plane in the raised position.

Stay 34 along with strip 30 form the first leg A of brace 24.

Pivotally connected at 29 with the upper end of strip 30 is a second strip 30' forming a second pocket 32' which receives semi-rigid stay 34' forming the second leg B of brace 24. It is noted that leg B is slightly longer than leg A.

Pivotally connected at 36 with the lower end of leg B is a third strip 30" forming pocket 32" which houses a third semi-rigid stay 34" forming third leg C. Leg C is about a third the length of legs A & B.

Secured also at pivot 36 is an end of flexible strap 38 which strap is located beneath leg C and is connected at its opposite end with bottom 20. Flexible strap 38 is of a length substantially the same but slightly longer than Leg C.

Flange 40, which extends outwardly of wall 12, 12' and 14 has secured to its upper surface skids 42. Skids 40 are formed of a low friction synthetic material, preferably a poly amid which is preferably coated with a vinyl on its lower side only. The coating welds to the coated surface of the flange and the bottom of the containment securing the skids in fixed position on the flange. Each skid 42 is vertically aligned with a brace 24 and is of a slightly greater width than strap 38 and legs A, B & C.

Strap 38 is also formed of a synthetic material preferably the same material forming skid 42 with a low friction outer surface in the form of a woven or knitted fabric. The outer surfaces of strap 38 are uncoated.

Referring now to FIGS. 3A, B and C, brace 24 can be seen in its folded position in which the wall of containment 10 is lowered into its down position with flotation member 52 lowered into a position adjacent bottom 20. Leg B is pivoted toward the wall and into a substantially horizontal position while leg C is moved into a substantially horizontal position between legs A, B. In this down position, the wall is in position to accommodate entry or exit of vehicles.

In the event spillage occurs while the wall is in the down position, flotation member 52 will first engage with the spilled fluid and will elevate the wall as the fluid level rises. The wall will move first into an intermediate position as shown in FIG. 3B. During this movement the ends of legs B, C which are supported on strap 38, begin to slide outwardly over skid 42. The outward force of the contained liquid is sufficient to continue to urge legs B, C of brace 24 outward until the end of leg C clears leg A allowing leg C to drop into the horizontal position shown in FIG. 3A. With legs A, B, C in these relative position, brace 24 is locked in its upstanding position. It is noted that strap 38 limits the extent of outward movement of legs B, C.

Secured on the inner side and adjacent upper edge 26 of each of end walls 12, 12', is a pocket or a plurality of pockets 48. Each pocket is constructed to include an elongate cavity adapted to receive or support a flotation device 50. The pockets extend between corners 16 substantially across end walls 12, 12".

Figure 1B:
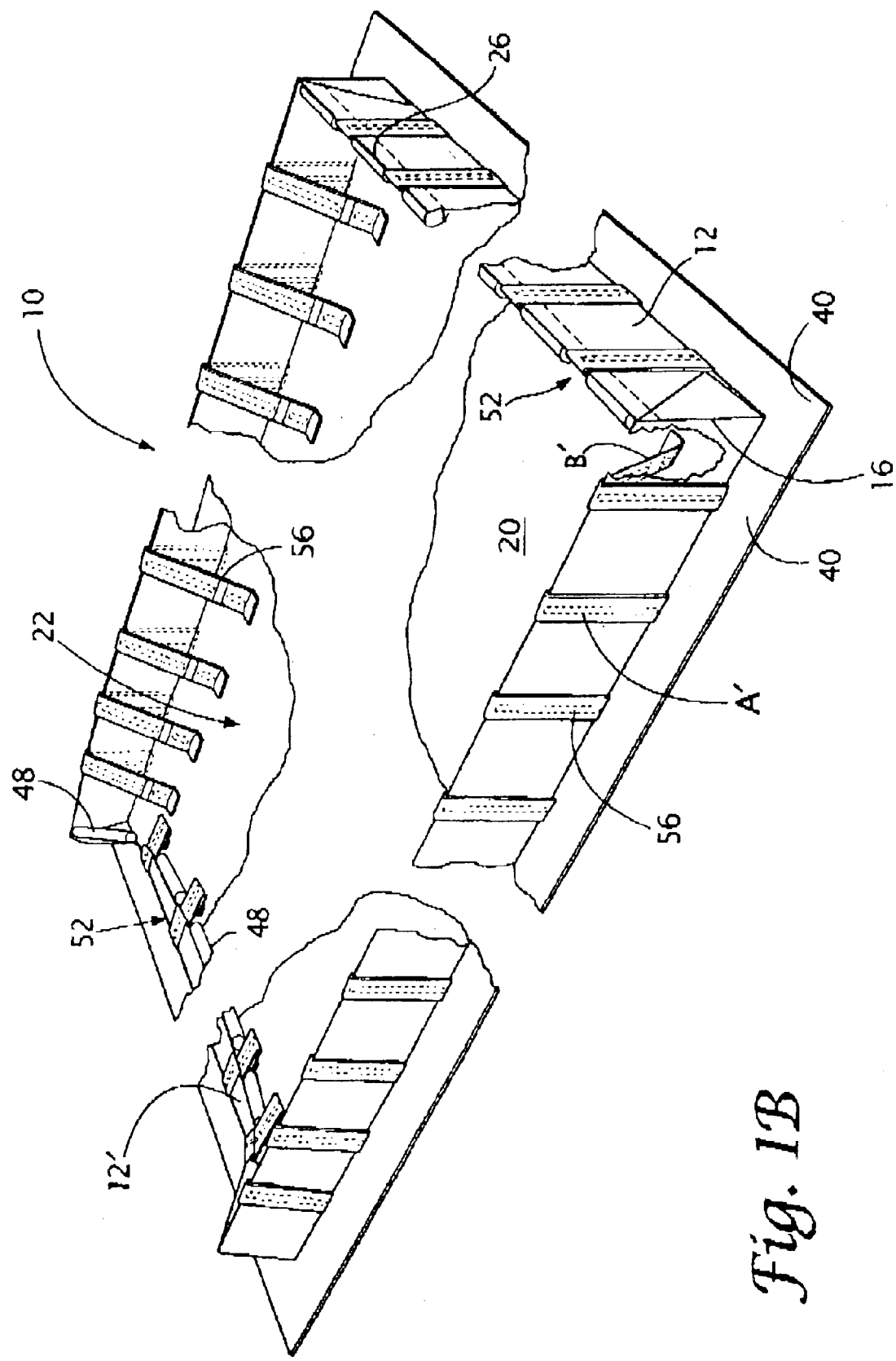
FIG. 1B is similar to FIG. 1a showing a second brace arrangement.

Turning now to FIGS. 1B, 4 and 5, a second arrangement of the bracing system is shown at 56. This brace arrangement, which operates only within the containment area, is more fully described in U.S. Pat. No. 5,316,175, the disclosure of which is incorporated herewith. As shown, end wall 12 connects with bottom 20 along seal 18. Strip 30 is secured with the outer surface of wall 12 and extends across the height of the wall, forming pocket 32 between strip 30 and wall 12. A semi-rigid stay or leg 34, which functions to maintain the wall in the raised position, is carried in pocket 32 forming leg A'.

The brace 56 includes a strip 58 which forms pocket 60 between hinge areas 62, 63. A semi-rigid bracing element or stay 64 is carried by pocket 60 forming leg B'. Strip 58 extends beyond hinge 63 in the form of semi-rigid extension 66 forming leg C'. The end portion 66' of extension 66 is secured to bottom 20 by heat seal at 67. A hinge area 68 is formed between end portion 66' and extension 66.

In use brace 56 is arranged with the lower end of leg B' engages with bottom 20 while extension 66 extends parallel and also in engagement with the bottom. When it is desired that wall 12 be lowered hinges 62, 63, 68 allow legs B' and C' to be configured as shown in FIG. 5 which allows wall 12 to move inwardly into its folded or down position and substantially parallel with floor 20.

Pockets 48 are provided along the inner side of at least walls 12 and 12' adjacent upper edge 26 and in spaced positions across or along the length of the end walls forming openings 52. These openings are adapted to receive brace members 56 both in the upstanding and folded positions. Openings 52 insure unobstructed movement of the brace in transition between positions.

Outer pockets 48 are preferably formed to begin adjacent each corner 16 and to terminate just short of first brace 56 adjacent hinge 62. A second pocket begins on the opposite side of brace 56 forming an opening 52 between adjacent pockets. Openings 52 are provided to receive and allow freedom of movement of leg B' when the walls of containment 10 are moved from the raised position to the down position or from the down position to the raised position. Openings 52 also allow the containment to be more evenly folded for storage.

Each pocket 48 supports or carries some type of flotation device 50. Preferably the flotation device comprise a plurality strips 59 of synthetic material such as foam polyethylene or other synthetic which does not degrade when in contact with petrochemicals. The members forming the flotation device could also comprise an air pocket or other floatable materials having suitable characteristics. Open cell polyurethane is preferred.

The flotation strips along with the corresponding pockets 48 may be of any of a plurality desired cross sections, four of which are shown in FIGS. 6a–b.

Preparatory to use, containment device 10 is transported to a desired area, unfolded and set up generally as shown in FIG. 1A or 1B with side walls 14 held in the generally raised positions and at least one of the end walls in the down position. Upon the arrival of a vehicle to be serviced, it is simply driven over the down end wall into containment area 22. The proper procedure is now to raise the down wall providing the containment area 22 with all walls in the raised position. At this point the vehicle can be serviced as necessary without the danger of accidentally spilled fluids resulting in ground contamination.

It has been reported that in some instances, through oversight or negligence, the down end wall has not been repositioned in its substantially upright position. This oversight, in some instances, has resulted in ground contamination.

In order to insure that the containment containing device does not allow accidental spillage the safety mechanism of this invention was devised in the form of flotation devices attached to the upper edge of end walls 12, 12'.

When an end wall is lowered into the entry/exit position shown in FIGS. 1A, B at least the inner ones of pockets 48 are adjacent to or are in engagement with bottom 20. Should fluids be spilled into containment area 22 they will first engage the flotation strips which in turn will elevate the down wall bringing braces 24 or 56 into their upstanding position.

While preferred embodiments of the invention have been described using specific terms, such description is for illustrative purposes only, and it is to be understood that changes and variations may be made without departing from the spirit or scope of the following claims.

What is claimed is:

1. A portable containment for containing spilled material:
   said containment having a bottom, opposed end walls and opposed side walls formed of flexible material and forming a containment area;
   a flotation member carried by upper edges of at least said end walls;
   a plurality of braces connected with upper portions of at least one of said walls, said braces being positionable in locked upstanding positions in which said at least one wall is held in a raised position and a lowered folded position in which said at least one wall is in a down entry/exit position;
   a plurality of skids formed of low friction synthetic material arranged along said bottom supporting said braces between said folded position and said upstanding position; wherein,
   in response to upward movement of said at least one wall, said
   braces are adapted to slide along said skids from said folded position into said upstanding position maintaining said at least one wall in said raised position.

2. The containment of claim 1 wherein said flexible material forming said containment comprises polyurethane coated fabric.

3. The containment of claim 1 wherein said synthetic fabric forming said strap and said skid are coated on one side, said coated side being unexposed.

4. The containment of claim 1 wherein said end wall, side walls, bottom, braces and skids forming said containment are united by welding.

5. The containment of claim 1 wherein said skid comprises a low friction synthetic fabric.

6. The containment of claim 5 wherein;
   each said brace includes a rigid first leg, a rigid second leg, a rigid third leg and a flexible strap, said first leg being carried by said wall in fixed position, said second leg being hinged at a first end with an upper portion of the associated of said walls and at a second end with said bottom, a first end of said strap and a first end of said third leg, said strap being connected at a second end with a lower portion of the associated said walls.

7. The containment of claim 6 wherein;
   each said brace forms a triangle in said upstanding position with said third leg being positioned above said strap along said bottom between a lower end of said first leg and said second end of said second leg.

8. The containment of claim 5 wherein said strap comprises a synthetic fabric, said fabric forming said strap and said fabric forming said skid allowing said sliding action of said brace during movement into said upstanding position.

9. The portable containment of claim 5 wherein; said bottom extends outwardly beyond said end walls, said skids being secured with said bottom extensions.

10. A portable containment for containing spilled material comprising;
    a bottom formed of flexible material;
    a pair of foldable side walls formed of flexible material; and,
    a pair of foldable end walls formed of flexible material, said side walls being interconnected with said end walls along opposed ends forming corners and said side walls and said end walls being connected along respective lower edges with said bottom forming a containment area;
    a plurality of braces engaged with said side and end walls to assist in maintaining said side and end walls in a raised position;
    a plurality of pivotal braces connected at a first end adjacent upper edges of said end and side walls and at a second end with said bottom, said pivotal braces having an extended position maintaining said side and end walls in said upstanding position for containing said spilled material and a folded position in which said side and end walls may be lowered into a down position for permitting vehicle drive over;
    flotation devices carried by pocket members arranged along upper edges of at least said end walls; whereby,
    in the absence of said braces being positioned in said upstanding position said flotation devices will elevate and maintain at least said end walls from said down position to a position above the level of said spilled material preventing contamination.

11. The portable containment of claim 10 wherein; at least said end wall comprises each said end wall.

12. The portable containment of claim 10 wherein; said flotation devices comprise strips of polyurethane foam.

13. The portable containment of claim 12 wherein; said polyurethane foam strip has a cross section which is one of rectangular, square, triangular, circular and half-circular.

14. The portable containment of claim 10 including pockets secured on the inner side of said end walls for supporting said flotation devices.

15. The portable containment of claim 14 wherein; said pockets comprise folded over upper edges of said end walls.

16. The portable containment of claim 10 wherein; said braces are permanently connected with said bottom inwardly of said end and side walls.

17. The portable containment of claim 10 wherein said flotation members are spaced by said brace members.

* * * * *